3,487,332
METHOD AND MEANS FOR HEAT SINKING LASER RODS
Clifford B. Cordy, Jr., Granada Hills, Calif., assignor to Union Carbide Corporation, a corporation of New York
Filed July 7, 1966, Ser. No. 563,568
Int. Cl. H01s 3/04
U.S. Cl. 331—94.5                     8 Claims

ABSTRACT OF THE DISCLOSURE

A portion of a laser rod surface is painted or covered with a liquid containing a metal. The metal may be either in suspension or soluble in the liquid. After a portion of the rod has been covered with the solution or suspension of metal, it is heated to remove the liquid or solvent and leave a metallic layer. This metallic layer may then be soldered directly to a heat sink and thus heat may be properly dissipated without having to contact the laser rod directly with water.

---

This invention relates to novel method and structure for dissipating heat from a solid state laser rod in a high average power system.

Heretofore, laser rods have been cooled by air or water flow past the rod depending on the power level at which the laser is operating. In high average power systems, water is pumped past the rod in order to effectively dissipate the heat generated. Such water systems wherein the laser rod is directly contacted with water causes sealing problems in the laser head. In addition, the water cooling system requires water pumps, power to drive the pumps, water storage means, water purification means, a water cooling radiator, and suitable cooperating fan to blow air through the radiator. In the event weight is a critical factor, a water cooling system is thus not feasible.

Water sealing problems about the laser rod itself can be avoided if it were possible to solder a laser rod directly to a heat sink. The heat sink itself could then be provided with fins with air blown past the fins and all water would be eliminated.

Generally, the lase rod itself cannot be directly soldered in a heat sink as the solder itself will not adhere to the rod material. To provide proper heat conduction from the rod to the heat sink necessitates a high conductivity coupling medium such as the solder. If any type of adhesive material, which is generally of lower heat conductivity than metal or solder, is employed to fix the laser rod in the heat sink, lower efficiency results in the dissipation of the heat.

With the foregoing considerations in mind, it is a primary object of the present invention to provide a method and means of heat sinking a laser rod without necessitating that the laser rod be in intimate contact with water, all to the end that a proper heat dissipation arrangement is provided and useable with high average power laser systems.

Briefly, this object is realized by providing a portion of the laser rod with a metallic coating or layer. This metallic coating or layer itself can then be easily soldered to a heat sink.

More particularly, in accordance with the method and means of this invention, a portion of a laser rod surface is painted or covered with a liquid containing a metal. The metal may be either in suspension or soluable in the liquid. After a portion of the rod has been covered with the solution or suspension of metal, it is heated to remove the liquid or solvent and leave a metallic layer. This metallic layer may then be soldered directly to the heat sink and thus heat may be properly dissipated without having to contact the laser rod directly with water.

Figure 1:
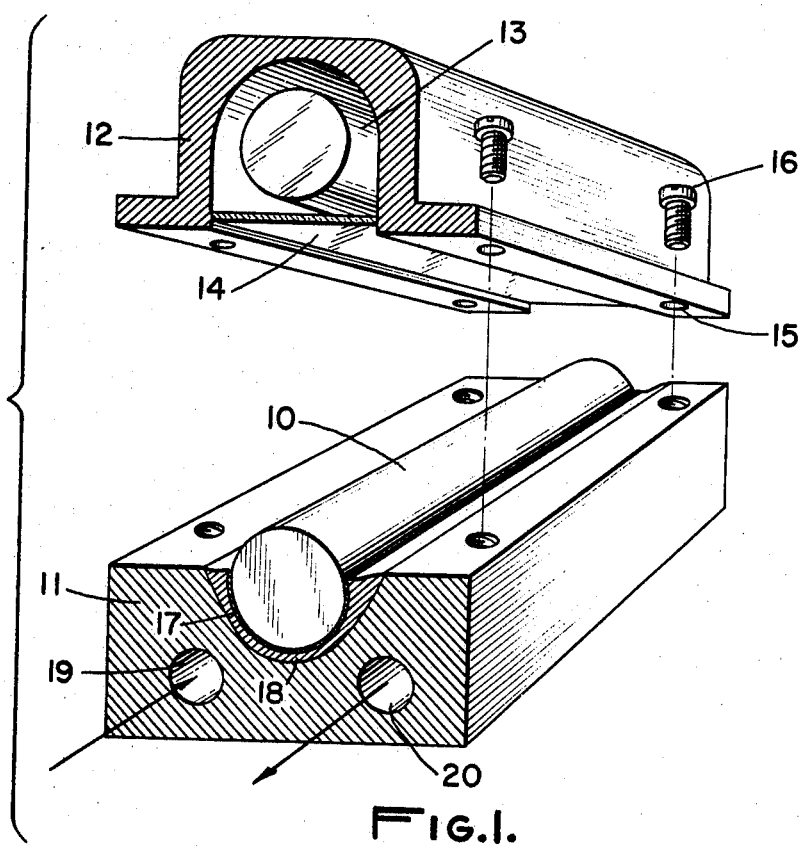
Figure 2:
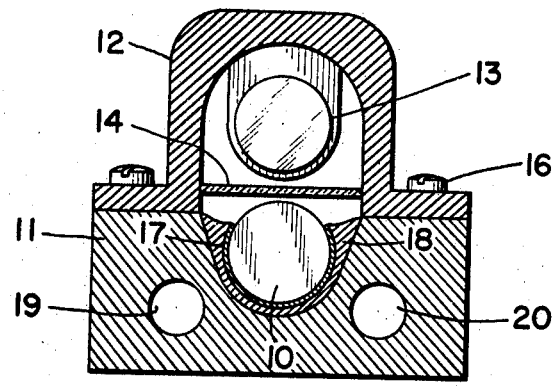

A better understanding of the invention will be had by referring to the accompanying drawings in which:

FIGURE 1 is an exploded perspective view of a laser head in which the method and means for heat sinking the laser is used; and FIGURE 2 is a front cross-sectional view of the components of FIGURE 1 in assembled relationship.

Referring first to FIGURE 1, there is shown, merely by way of example, a laser rod 10, such as a ruby crystal secured to a heat sink 11 in the form of a block of copper or other high heat conductivity metal. A cover structure 12 including a suitable light source 13 and suitable filter 14 is arranged to be secured to the heat sink 11. This securement may be effected through suitable bolt holes 15 and cooperating bolts such as indicated at 16.

In affixing the laser rod 10 to the heat sink 11 in accordance with the invention, the rod 10 has at least a portion of its surface, such as the semi-cylindrical surface portion facing away from the light source 13 when the structure is assembled, covered with a metallic layer 17. This layer is provided by painting the surface with a metallic paint or otherwise covering the surface with a metallic solution or suspension. After this covering step, the surface is heated to evaporate or otherwise remove the liquid or solvent involved thereby leaving the metallic layer. This covering and heating step may be repeated a number of times to build up a layer 17 of desired thickness; for example, from 5 to 10 microns.

Thereafter, the metallic layer 17 is directly soldered to the heat sink, the solder, shown in FIGURES 1 and 2 at 18, filling the space between the layer and a suitable cavity formed in the heat sink. The thickness of the solder may be of the order of 50 microns.

It will be understood that solder can be employed to fix the laser rod 10 into the heat sink as a result of the provision of the metallic layer and the unique method by which this layer is provided on the laser rod.

As illustrated in both FIGURES 1 and 2, the heat sink 11 itself may include suitable passages or openings such as indicated at 19 and 20 for circulating water through the copper block and thus cooling the block. Alternatively, suitable fins (not shown) may be formed on the block and air passed through the fins to remove heat from the heat sing itself as by convection and radiation. In either event, it will be evident that there are no sealing problems involved in the vicinity of the laser rod itself since there is no direct contact between the rod and any cooling water.

When the laser is operating, heat will be conducted directly through the metallic layer 17 and solder 18 to the heat sink 11. This direct conduction of heat away from the laser rod will provide sufficient cooling even under high average power operating conditions.

In actual embodiments of the invention, both gold and silver paints have been used successfully to provide the metallic layer on a surface portion of the laser rod. Other metallic paints however could be used.

From the foregoing description, it will be evident that the present invention has provided a unique method and means for cooling a laser rod by enabling direct heat sinking of the laser rod itself and thus effecting a desired heat dissipation without having to contact the rod directly with water or cooling air.

What is claimed is:

1. A method of treating a laser rod for dissipating heat therefrom comprising the steps of: depositing metal on at least a portion of the surface of said rod; and soldering said metal directly to a heat sink.

2. A method of treating a laser rod for dissipating heat therefrom, comprising the steps of: covering at least a portion of the surface of said rod with a liquid containing a metal; heating said portion to remove the liquid and leave a metallic layer on said portion; and soldering said layer directly to a heat sink.

3. The method of claim 2, including the additional steps of re-covering said metallic layer with said liquid containing a metal before soldering said layer to a heat sink; and heating said recovered portion to removed said liquid and thereby provide a thicker overall metallic layer on said rod; and repeating said covering and heating steps until a metallic layer of desired thickness is realized.

4. The method of claim 2, in which said liquid containing a metal constitutes a solution of metal.

5. The method of claim 2, in which said liquid containing a metal constitutes a suspension of metal.

6. The method of claim 2, in which said liquid containing a metal comprises a paint, said covering step being carried out by painting said portion of said rod.

7. Means for dissipating heat from a laser rod comprising: a heat sink; a laser rod having at least a portion of its surface covered with a metallic layer; and solder disposed between said layer and heat sink so that heat is conducted from said laser rod to said heat sink through said metallic layer and solder.

8. The subject matter of claim 7, including means for cooling said heat sink.

References Cited

UNITED STATES PATENTS 3,355,674   11/1967   Hardy _____ 331—94.5

OTHER REFERENCES

Roess, "Exfocal Pumping of Optical Masers in Elliptical Mirrors," Applied Optics, vol. 3, February 1964, pp. 259–265.

ROY LAKE, Primary Examiner

S. H. GRIMM, Assistant Examiner

U.S. Cl. X.R.

330—4.3